UNITED STATES PATENT OFFICE.

AUGUST BLANK, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

TRISAZO DYE.

1,052,031.  Specification of Letters Patent.  Patented Feb. 4, 1913.

No Drawing.   Application filed April 1, 1912.  Serial No. 687,832.

*To all whom it may concern:*

Be it known that I, AUGUST BLANK, doctor of philosophy, chemist, citizen of the German Empire, residing at Leverkusen, near Cologne, Germany, have invented new and useful Improvements in Trisazo Dye, of which the following is a specification.

The present application is a continuation in part of my application Serial No. 630646, filed June 1, 1911 and concerns the manufacture and production of new azo dyestuffs which are obtained by combining the diazo compounds prepared from aminosulfonic acid, *e. g.* sulfanilic acid, etc., with an amin of the benzene series having a free para-position to the amino group, rediazotizing the aminoazo compounds thus obtained, combining the diazoazo compounds with a second molecule of the same or another of such an amin, such as anilin, toluidin, xylidin, aminophenol ethers, cresidin, rediazotizing the aminodisazo compounds and combining the diazo compounds with a dioxyquinolin, and more particularly with alpha-gamma-dioxyquinolin, and its substitution products.

One molecule of the two middle components can also be 1-naphthylamin or its sulfonic acids. Orange to blue-red cotton dyestuffs are thus obtained; they are after being dried and pulverized dark powders soluble in water generally with a brown to blue coloration. Upon treatment with stannous chlorid and hydrochloric acid they are split up, an amino sulfonic acid, a diamin and an amin are obtained.

In order to illustrate the new process more fully the following example is given, the parts being by weight:—347 parts of the sodium salt of 2-naphthylamin-3.6-disulfonic acid are diazotized at about 15–20° C. with 69 parts of sodium nitrite. The diazo solution is combined with a solution of 107 parts of meta-toluidin in water containing 150 parts of hydrochloric acid, 130 parts of sodium acetate are slowly added. The mixture is then neutralized with sodium carbonate, caustic soda lye is added to prepare the sodium salt of the dye, 69 parts of sodium nitrite are added and then it is diazotized by adding at 10–15° C. 450 parts of hydrochloric acid. The diazotization is complete after stirring for 3 to 4 hours and the resulting diazo compound is then again combined in the same manner with 107 parts of meta-toluidin. The second intermediate product is then dissolved by the addition of NaOH and hot water. After filtration 69 parts of sodium nitrite are added and finally after cooling to zero sufficient hydrochloric acid to produce diazotization. The diazodisazo compound which separates is filtered off, mixed with water and added to an aqueous solution cooled to 0° C. of 161 parts of dioxyquinolin containing 40 parts of caustic soda and 250 parts of soda. After stirring for several hours the dye is isolated in the usual manner. It is after being dried and pulverized a brown powder having most probably the following formula:

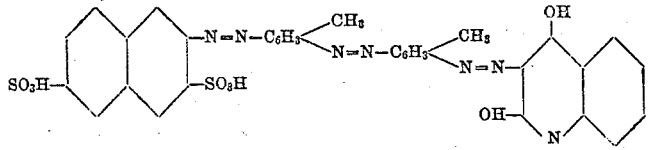

soluble in water with a brown coloration and yielding upon reduction with stannous chlorid and hydrochloric acid 2-naphthylamin-3.6-disulfonic acid, diaminomethyl-benzene and aminodioxyquinolin. It dyes cotton in orange-brown shades fast to light. 2-naphthylamin-4.8-disulfonic acid, sulfanilic acid and anilin, etc., can be used as first component.

I claim:—

1. The new trisazo dyestuffs of the following general formula:

where R, $R_1$ and $R_2$ are aromatic radicals, and where at least one of the middle components is of the benzene series, and $R_3$ the radical of dioxyquinolin, which dyestuffs are after being dried and pulverized brown and dark powders soluble in water generally with a brown to blue coloration, and dyeing cotton orange-brown to violet-brown shades fast to light, substantially as described.

2. The new trisazo dyestuffs of the following general formula:

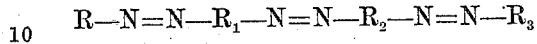

where R is the radical of an aromatic sulfonic acid, $R_1$ and $R_2$ the radicals of aromatic middle components of which at least one must be of the benzene series, and $R_3$ the radical of dioxyquinolin, which dyestuffs are after being dried and pulverized brown and dark powders soluble in water generally with an orange-brown to blue coloration, and dyeing cotton orange-brown to violet-brown shades fast to light, substantially as described.

3. The new trisazo dyestuffs of the following general formula:

where R is the radical of a sulfonic acid of the naphthalene series, $R_1$ and $R_2$ aromatic radicals of which at least one is of the benzene series, and $R_3$ the radical of dioxyquinolin, which dyestuffs are after being dried and pulverized brown and dark powders soluble in water generally with an orange-brown to blue coloration and dyeing cotton orange-brown to violet-brown shades fast to light, substantially as described.

4. The new trisazo dyestuffs of the following general formula:

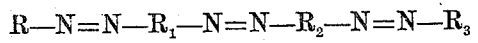

where R is the radical of a sulfonic acid of the naphthalene series, $R_1$ and $R_2$ aromatic radicals of the benzene series, and $R_3$ the radical of dioxyquinolin, which dyestuffs are after being dried and pulverized brown powders soluble in water generally with a brown coloration, and dyeing cotton orange-brown to red-brown shades fast to light, substantially as described.

5. The new trisazo dyestuffs of the following formula:

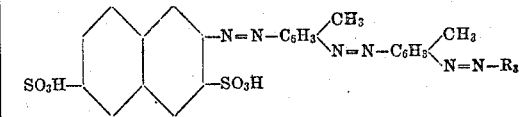

where $R_3$ is the radical of alpha-gamma-dioxyquinolin, which dyestuffs are after being dried and pulverized brown powders soluble in water generally with a brown coloration, and dyeing cotton orange-brown shades fast to light, substantially as described.

In testimony whereof I have hereunto set my hand in the presence of two subscribing witnesses.

AUGUST BLANK. [L. S.]

Witnesses:
HELEN NUFER,
ALBERT NUFER.